United States Patent [19]

Matsubara et al.

[11] Patent Number: 5,807,209
[45] Date of Patent: Sep. 15, 1998

[54] VEHICLE LOCK-UP CLUTCH SLIP CONTROL APPARATUS WHEREIN SLIP CONTROL DURING VEHICLE DECELERATION IS TERMINATED IF SLIP AMOUNT OF THE CLUTCH IS LARGER THAN A THRESHOLD

[75] Inventors: Tooru Matsubara; Kunihiro Iwatsuki, both of Toyota; Yasuhiko Higashiyama, Nagoya, all of Japan

[73] Assignee: Toyota Jidosha Kabushiki Kaisha, Toyota, Japan

[21] Appl. No.: 694,028

[22] Filed: Aug. 8, 1996

[30] Foreign Application Priority Data

Aug. 9, 1995 [JP] Japan ................................. 7-202985

[51] Int. Cl.$^6$ ........................... B60K 41/02; F16H 61/14
[52] U.S. Cl. ........................ 477/176; 477/62; 477/169
[58] Field of Search ........................... 477/57, 62, 169, 477/176; 192/3.3

[56] References Cited

U.S. PATENT DOCUMENTS

| | | | |
|---|---|---|---|
| 5,085,301 | 2/1992 | Imamura et al. | 477/176 |
| 5,141,089 | 8/1992 | Nobumoto et al. | 477/169 |
| 5,547,438 | 8/1996 | Nozaki et al. | 477/169 |
| 5,562,571 | 10/1996 | Maruyama et al. | 477/176 |
| 5,626,535 | 5/1997 | Kono et al. | 477/169 |
| 5,626,536 | 5/1997 | Kono et al. | 192/3.3 |

FOREIGN PATENT DOCUMENTS 5-149423  6/1993  Japan .

Primary Examiner—Khoi Q. Ta
Assistant Examiner—Sherry Lynn Estremsky
Attorney, Agent, or Firm—Oblon, Spivak, McClelland, Maier & Neustadt, P.C.

[57] ABSTRACT

An apparatus for controlling of a lock-up clutch between a pump impeller and a turbine runner of a fluid-filled power transmitting device of a motor vehicle equipped with a fuel-cut control device for cutting a fuel supply to an engine when the engine speed is higher than a predetermined level, wherein a slip control device is provided to effect a deceleration slip control in which a pilot pressure for controlling the lock-up clutch is controlled during vehicle deceleration such that an actual slip amount of the clutch coincides with a target value, the apparatus including a monitoring device for determining whether the actual slip amount during the deceleration slip control by the slip control device is larger than a predetermined threshold, and a terminating device for terminating the deceleration slip control of the clutch by the slip control device, if the monitoring device determines that the actual slip amount is larger than the predetermined threshold.

8 Claims, 10 Drawing Sheets

| SHIFT POSITION | | | SOLENOID VALVES | | | | | | | CLUTCHES | | | BRAKES | | | | |
|---|---|---|---|---|---|---|---|---|---|---|---|---|---|---|---|---|---|
| | | | No.1 | No.2 | No.3 | No.4 | SLU | SLN | C-1 | C-2 | C-0 | B-1 | B-2 | B-3 | B-4 | B-0 |
| P | | | ○ | × | × | × | × | × | × | × | × | × | × | × | ○ | × |
| R | (V<20) | | × | × | × | ○ | × | × | × | ○ | × | × | × | × | ○ | ○ |
| R | (V≧20) | | ○ | ○ | × | ○ | × | × | × | ○ | × | × | × | × | × | × |
| N | | | ○ | × | × | × | × | × | × | × | × | × | × | × | ○ | × |
| D・3・2・(L) | 1st | NORMAL | ○ | × | ○ | ○ | × | × | ○ | × | × | × | × | × | × | × |
| | | ENGINE BRAKE | ○ | × | ○ | × | × | ○ | ○ | × | ○ | × | × | × | ○ | × |
| | 2nd | NORMAL | ○ | ○ | ○ | ○ | × | × | ○ | × | × | × | × | × | × | × |
| | | ENGINE BRAKE | ○ | ○ | ○ | × | × | ○ | ○ | × | ○ | × | × | ○ | × | × |
| | 3rd | NORMAL | × | ○ | ○ | ○ | × | × | ○ | × | ○ | × | ○ | ○ | × | × |
| | | ENGINE BRAKE | × | ○ | ○ | × | × | ○ | ○ | × | ○ | ○ | ○ | × | × | × |
| | 4th | | × | × | ○ | ○ | ◎ | × | ○ | ○ | ○ | × | ○ | × | × | × |
| | 5th | | × | × | × | ○ | ◎ | × | ○ | ○ | × | × | ○ | × | × | × |

LEGEND: ○ ON; × OFF; ◎ ON: L-UP ON, OFF: L-UP OFF
ENGAGED / RELEASED

FIG.2

VEHICLE LOCK-UP CLUTCH SLIP CONTROL APPARATUS WHEREIN SLIP CONTROL DURING VEHICLE DECELERATION IS TERMINATED IF SLIP AMOUNT OF THE CLUTCH IS LARGER THAN A THRESHOLD

BACKGROUND OF THE INVENTION

1. Field of the Invention

The present invention relates to an apparatus for controlling the amount of slip of a lock-up clutch which is provided in a power transmitting system of a motor vehicle, for direct connection of an engine to an automatic transmission.

2. Discussion of the Related Art

In a motor vehicle having a fluid-filled power transmitting device equipped with a lock-up clutch, such as a torque converter or fluid coupling incorporating such a lock-up clutch, it is proposed to control the lock-up clutch in a slip control mode (partially slipping or engaging mode) such that an actual amount of slip (i.e., slip speed) of the lock-up clutch, namely, a difference between the speeds of a pump impeller and a turbine runner or impeller of the power transmitting device eventually coincide with a predetermined target slip speed, during acceleration of the vehicle, for the purpose of minimizing power loss at the lock-up clutch and improving the fuel economy of the vehicle. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening angle and vehicle running speed) indicative of the vehicle running condition.

It is also proposed to control the lock-up clutch in the slip control mode during deceleration or coasting of the vehicle, where the vehicle is equipped with a fuel-cut control device adapted to cut a fuel supply to the engine while the engine speed is higher than a predetermined fuel-cut speed. The slip control of the lock-up clutch during deceleration of the vehicle (hereinafter referred to as "deceleration slip control" of the lock-up clutch) is effected for the purpose of raising the engine speed by a drive force transmitted to the engine from the vehicle drive wheels through the partially engaging lock-up clutch, so that the engine speed is kept above the fuel-cut speed for a prolonged period of time, to thereby effect the fuel cut of the engine for such a prolonged period of time.

The deceleration slip control of the lock-up clutch is continued while a decelerating state of the vehicle is detected. The decelerating state may be detected by an idling position switch which detects that a throttle valve of the engine is placed in its engine idling position, which indicates that the vehicle is in the decelerating or coasting state. The deceleration slip control is terminated when the fuel cut of the engine by the fuel-cut control device is terminated. During the deceleration slip control, the engine speed is raised to a level which is lower than the speed of the turbine runner by the target slip speed of the lock-up clutch, whereby the moment at which the engine speed falls below the predetermined fuel-cut speed is extended, and the period of the fuel cut is accordingly prolonged, with a result of improving the fuel economy. An example of the fuel-cut control device is disclosed in JP-A-5-149423.

The deceleration slip control of the lock-up clutch is also initiated when the accelerator pedal of the vehicle is released during slip control of the lock-up clutch while the vehicle is in an accelerating state (hereinafter referred to as "acceleration slip control" of the lock-up clutch). A time chart of FIG. 12 shows changes in various parameters of the vehicle such as the slip speed of the lock-up clutch and the drive torque of the vehicle. $D_{SLU}$ in FIG. 12 represents a duty ratio of a linear solenoid valve which produces a slip control pilot pressure to be applied to the lock-up clutch. This pilot pressure determines the engaging pressure (engaging force) of the lock-up clutch, which engaging pressure determines the slip speed of the lock-up clutch. The duty ratio may be calculated according to the following equation (1):

$$D_{SLU}=DFWD+DFB+KGD \tag{1}$$

In the above equation, DFWD represents a feed-forward control value determined by the opening angle of the throttle valve, for example, and DFB represents a feedback control device calculated on the basis of a difference between the actual and target slip speeds of the lock-up clutch. Further, KGD represents a learning control value which is updated from time to time depending upon the varying characteristics of the lock-up clutch, for example. Both the feed-forward control value DFWD and the learning control value KGD are considered to be feed-forward components.

In the specific example of FIG. 12, the acceleration slip control of the lock-up clutch is effected up to a point of time t0. In this acceleration slip control, the engaging pressure of the lock-up clutch is controlled to be comparatively high so that the actual slip speed of the lock-up clutch (which is equal to the engine speed minus the turbine runner speed) is held at a predetermined positive value (e.g., about 50 r.p.m.). When the accelerator pedal is released at the point of time t0, the acceleration slip control of the lock-up clutch is terminated, and the deceleration slip control is initiated. In a time period immediately after the initiation of the deceleration slip control, the engine speed and the actual slip speed of the lock-up clutch are gradually reduced. If the feed-forward control value DFWD is excessively small, the duty ratio $D_{SLU}$ is accordingly lowered, whereby the actual slip speed is reduced below zero, and becomes negative with the turbine runner speed exceeding the engine speed. Since the lock-up clutch is temporarily placed in a substantially fully released state, the slip speed of the lock-up clutch is further reduced, that is, the amount of slip of the lock-up clutch in the negative direction is further increased, after the fuel cut of the engine is initiated at a point of time t1. In this respect, it is noted that the feed-forward control components in the above equation (1) are generally determined to be comparatively large so that the actual slip speed of the lock-up clutch coincides with the target slip speed during the deceleration slip control. However, the feed-forward control components used to control the duty ratio $D_{SLU}$ may be smaller than required, due to fluctuating factors such as variation in the friction coefficient of the lock-up clutch during initial use thereof, chronological changes of the lock-up clutch, and change in the viscosity of a working fluid in the torque converter.

In the above situation, the addition of the feedback control value to the duty ratio $D_{SLU}$ upon initiation of the fuel cut of the engine at the point of time t1 would not increase the duty ratio $D_{SLU}$ to an adequate value, resulting in a decrease of the actual slip speed of the lock-up clutch below the target slip speed, that is, an increase in the slip amount of the lock-up clutch in the negative direction. To bring the lock-up clutch from the fully released state to a partially engaging or slipping state, the duty ratio $D_{SLU}$ in this transient phase of the deceleration slip control should be higher than a nominal value (a % as indicated in FIG. 12) in a steady phase of the deceleration slip control, so that the actual slip speed coincides with the predetermined target slip speed. The feedback control value which corresponds to the difference between the actual and target slip speeds will gradually increase the duty ratio $D_{SLU}$, and the actual slip speed will begin to increase toward the target value at a point of time t2. However, the actual slip speed tends to increase at a considerably high rate, that is, the amount of slip of the lock-up clutch in the negative direction tends to decrease at a considerably high rate toward zero, and the lock-up clutch may suffer from a considerable engaging shock due to an abrupt increase in the drive torque, as indicated in FIG. 12.

In the light of the above drawback, the above-identified publication JP-A-5-149423 proposes to terminate the deceleration slip control of the lock-up clutch if the engine speed is lowered below a predetermined lower limit in an initial period of the deceleration slip control. This arrangement is effective to reduce the engaging shock of the lock-up clutch as described above, and reduce the deterioration of the driving comfort of the vehicle. In this respect, it is noted that the reduction of the slip speed below zero with the engine speed being lower than the turbine runner speed is caused primarily by reduction of the engine speed, and that the deceleration slip control should not be continued if the engine speed falls below the lower limit. The above proposal to terminate the deceleration slip control is based on this finding, and relies upon the engine speed to determine whether the lock-up clutch is expected to undergo the engaging shock during the deceleration slip control if this control is continued even after the engine speed falls below the lower limit.

However, the proposal disclosed in the above-identified publication may suffer from the engaging shock of the lock-up clutch before the determination that the deceleration slip control should be terminated. Described more specifically, the determination tends to be delayed since the determination relies upon the engine speed only, that is, the determination does not relies upon the actual slip speed between the engine speed and the turbine runner speed, which actual slip speed is used to control the amount of slip of the lock-up clutch in the slip control mode. In other words, the determination as to whether the deceleration slip control should be terminated is effected irrespective of the slip speed of the lock-up clutch, which is the difference between the engine speed and the turbine runner speed.

The slip control apparatus disclosed in the above publication has a further problem due to an arrangement wherein a threshold with which the engine speed is compared to effect the above-indicated determination is determined based on the condition in the steady phase of the deceleration slip control which follows the initial transient phase in which the slip speed of the lock-up clutch varies in a considerable degree. This arrangement is not capable of adequately determining the termination of the deceleration slip control, if the absolute value of the negative actual slip speed (i.e., the amount of slip in the negative direction) of the lock-up clutch is comparatively small in the initial transient phase of the control. In this case, therefore, the lock-up clutch may suffer from an engaging shock leading to deteriorated driving comfort of the vehicle. In the steady phase of the deceleration slip control, the lock-up clutch is comparatively highly responsive to a temporary change of the slip speed (temporary increase in the slip amount in the negative direction), and the lock-up clutch is less likely to suffer from an engaging shock in the steady phase. To avoid erroneous determination due to external noises or disturbances during running of the vehicle (e.g., shifting action of an automatic transmission or activation or de-activation of an air conditioner during the deceleration slip control), the determination that the deceleration slip control should be terminated is desirably made only where the condition of the deceleration slip control in the steady phase is considerably deteriorated. In other words, the standard that should be satisfied to terminate the deceleration slip control should be comparatively loose in the steady phase. This arrangement is more effective to improve the fuel economy of the vehicle by the deceleration slip control of the lock-up clutch. In the initial transient phase of the deceleration slip control, on the other hand, the lock-up clutch is relatively likely to be fully released and suffer from an engaging shock, due to small values of the feed-forward control components such as the feed-forward control value DFWD. To prevent an engaging shock of the lock-up clutch and the resulting deterioration of the driving comfort of the vehicle, the determination as to whether the deceleration slip control should be terminated is desirably made before the condition of the deceleration slip control in the transient phase is considerably deteriorated. In other words, the standard that should be satisfied to terminate the deceleration slip control should be comparatively stringent in the transient phase.

SUMMARY OF THE INVENTION

It is therefore a first object of this invention to provide a slip control apparatus for a lock-up clutch in a power transmitting system of a motor vehicle, which apparatus permits accurate determination as to whether a deceleration slip control of the lock-up clutch during deceleration of the vehicle should be terminated.

The above object may be achieved according to the principle of the present invention, which provides an apparatus for controlling an amount of slip of a lock-up clutch interposed between a pump impeller and a turbine runner of a fluid-filled power transmitting device of a motor vehicle equipped with a fuel-cut control device for cutting a fuel supply to an engine when a speed of the engine is higher than a predetermined fuel-cut level, the apparatus including slip control means which is capable of effecting a deceleration slip control wherein a pilot pressure for controlling the lock-up clutch is controlled during deceleration of the vehicle such that an actual slip amount of the lock-up clutch coincides with a predetermined target value, the apparatus comprising: (a) slip amount monitoring means for determining whether the actual slip amount of the lock-up clutch during the deceleration slip control by the slip control means is larger than a predetermined threshold; and (b) deceleration slip control terminating means for terminating the deceleration slip control of the lock-up clutch by the slip control means, if the slip amount monitoring means determines that the actual slip amount is larger than the predetermined threshold.

In the slip control apparatus of the present invention constructed as described above, the deceleration slip control terminating means terminates the deceleration slip control by the slip control means if the slip amount monitoring means determines that the actual slip amount of the lock-up clutch during the deceleration slip control is larger than the predetermined threshold.

As described above, the present apparatus is adapted such that the determination as to whether the deceleration slip control should be continued or terminated is effected based on the actual slip amount of the lock-up clutch during the deceleration slip control by the slip control means. Accordingly, the present slip control apparatus does not suffer from a delay in the determination of terminating the deceleration slip control, which would take place in the prior art in which the determination is based on the engine speed only. Therefore, the present apparatus permits accurate or adequate determination as to whether the deceleration slip control should be continued or terminated. It is noted that the actual slip amount of the lock-up clutch reflects not only the engine speed (namely, the speed of the pump impeller) but also the speed of the turbine runner.

In a first preferred form of the present slip control apparatus, the slip amount monitoring means is adapted to effect a determination as to whether the actual slip amount of the lock-up clutch is larger than the predetermined threshold, when a predetermined time has passed after an opteration of the fuel-cut control device to cut the fuel suppy to the engine is initiated in an initial transient phase of the deceleration slip control by the slip control means.

In the above preferred form of the apparatus, the slip amount monitoring means is adapted to detect the actual slip amount of the lock-up clutch when the predetermined time has passed after the initiation of operation of the fuel-cut control device to cut the fuel supply to the engine. This predetermined time is determined so that the actual slip amount of the lock-up clutch (in the negative direction) is detected at a moment at which or shortly before which the slip amount of the lock-up clutch is expected to have increased to the largest value in the initial transient phase of the deceleration slip control. Since the determination as to whether the deceleration slip control should be terminated is effected at the thus determined moment, the determination accurately reflects the actual condition of the deceleration slip control in the initial transient phase after the initiation of the fuel cut control by the fuel-cut control device, even where the time between the initiation of the deceleration slip control and the initiation of the fuel cut control is changed depending upon the running speed of the vehicle.

In a second preferred form of the present invention, the slip control apparatus further comprises pilot pressure learning-compensation means operated upon termination of the deceleration slip control by the deceleration slip control terminating means, for increasing the pilot pressure to be established in a next operation of the deceleration slip control by the slip control means.

In the above second preferred form of the invention, the pilot pressure to be established in the next deceleration slip control by the slip control means is changed by the pilot pressure learning-compensation means, to a value higher than that used in the deceleration slip control which is terminated by the deceleration slip control means.

In the above preferred form of the apparatus, therefore, the pilot pressure increased by the pilot pressure learning-compensation means is established in the next deceleration slip control operation effected after the deceleration slip control terminating means is operated to terminate the preceding deceleration slip control operation. This arrangement is effective to prevent an increase in the slip amount of the lock-up clutch in the negative direction (a decrease in the slip speed of the lock-up clutch) in the next and subsequent deceleration slip control operations, and prevent the termination of these next and subsequent deceleration slip control operations. That is, the adjustment of the pilot pressure by the pilot pressure learning-compensation means permits the subsequent deceleration slip control operations to be performed in the intended manner. In this respect, it is noted that an increase in the slip amount of the lock-up clutch immediately after the initiation of the deceleration slip control generally arises from an excessively low level of the pilot pressure at the time of the initiation of the deceleration slip control. Therefore, in the event of termination of a deceleration slip control operation of the slip control means by the deceleration slip control terminating means, the pilot pressure is increased in the present arrangement, to avoid an increase in the slip amount of the lock-up clutch in the next deceleration slip control operation, and avoid termination of the subsequent deceleration slip control operations in the initial transient phase, for thereby improving the fuel economy of the vehicle.

In one advantageous arrangement of the above preferred form of this invention, the slip control means controls the pilot pressure by controlling a duty ratio of a linear solenoid valve which produces the pilot pressure, the slip control means determining the duty ratio on the basis of at least one feed-forward control value determined by at least one of an output torque of the engine and characteristics of the lock-up clutch, and a feedback control value determined by a difference between the actual slip amount of the lock-up clutch and the predetermined target value. In this arrangement, the pilot pressure learning-compensation means is adapted to increase at least one of the above-indicated at least one feed-forward control value when the slip amount monitoring means determines that the actual slip amount is larger than the predetermined threshold.

In the above arrangement, the above-indicated at least one feed-forward control value may include a feed-forward control value determined on the basis of the output torque of the engine which varies as a function of an opening angle of a throttle valve of the engine and a rotating speed of the engine, and a learning control value determined by the characteristics of the lock-up clutch. In this instance, the pilot pressure learning-compensation means is adapted to increase the learning control value when the slip amount monitoring means determines that the actual slip amount is larger than the predetermined threshold. Since the adjustment of the learning control value is comparatively easy, the pilot pressure can be comparatively easily compensated by the pilot pressure learning-compensation means.

BRIEF DESCRIPTION OF THE DRAWINGS

The above and optional objects, features, advantages and technical and industrial significance of the present application will be better understood by reading the following detailed description of a presently preferred embodiment of this invention, when considered in connection with the accompanying drawings, in which:

FIG. 2 is a table indicating a relationship between the operating positions of an automatic transmission connected to the torque converter and the respective combinations of the operating states of solenoid-operated valves of the slip control apparatus;

DETAILED DESCRIPTION OF THE PREFERRED EMBODIMENT

Figure 1:
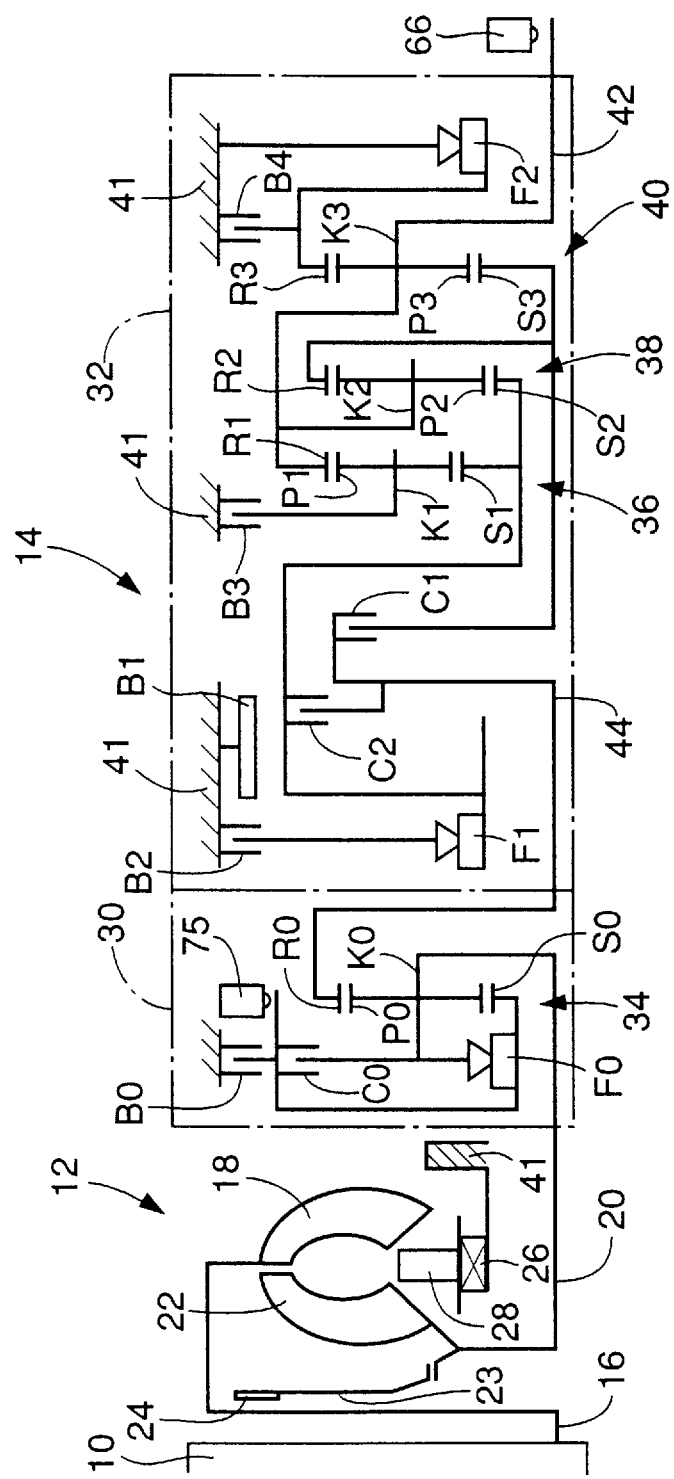
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to an automatic transmission 14 through a torque converter 12 equipped with a lock-up clutch 24, and the power is transferred to drive wheels of the vehicle through a differential gear and a drive axle. The lock-up clutch 24 is controlled by a slip control apparatus constructed according to one embodiment of the present invention, as described below.

The torque converter 12 includes: a pump impeller 18 connected to a crankshaft 16 of the engine 10; a turbine runner 22 fixed to an input shaft of the automatic transmission 14 and rotatable by the pump impeller 18; a stator 28 whose rotation in one direction is inhibited by a one-way clutch 26; and the above-indicated lock-up clutch 24 connected to the input shaft 20 through the turbine runner 22. The pump impeller 18 includes a radially outer portion which is U-shaped in cross section, and a plurality of curved vanes which are arranged in the circumferential direction and formed so as to cause a flow of a working oil, which flow includes a component moving toward the turbine runner 22 on the side of the engine 10. The turbine runner 22 includes a plurality of curved vanes opposed to the vanes of the pump impeller 18. In operation of the torque converter 12, the turbine runner 22 is rotated by the oil flow from the vanes of the pump impeller 18 rotated by the engine 10. The lock-up clutch has a piston 23 which engages a hub of the turbine runner 22 such that the piston 23 is axially slidable relative to and rotatable with the turbine runner 22.

The automatic transmission 14 includes a first transmission unit 30 having a high-gear position and a low-gear position, and a second transmission unit 32 having a rear-drive position and four forward-drive positions. The first transmission unit 30 has a high-low planetary gear set 34, a clutch C0, a one-way clutch F0, and a brake B0. The high-low planetary gear set 34 includes a sun gear S0, a ring gear R0, a carrier K0, and a planetary gear P0 which is rotatably supported by the carrier K0 and which meshes with the sun gear S0 and the ring gear R0. The clutch C0 and the one-way clutch F0 are provided between the sun gear S0 and the carrier K0. The brake B0 is provided between the sun gear S0 and a housing 41 of the automatic transmission 14.

The second transmission unit 32 includes a first planetary gear set 36, a second planetary gear set 38, and a third planetary gear set 40. The first planetary gear set 36 includes a sung gear S1, a ring gear R1, a carrier K1, and a planetary gear P1 which is rotatably supported by the carrier K1 and which meshes with the sun and ring gears S1, R1. The second planetary gear set 38 includes a sun gear S2, a ring gear R2, a carrier K2, and a planetary gear P2 which is rotatably supported by the carrier K2 and which meshes with the sun and ring gears S2, R2. The third planetary gear set 40 includes a sun gear S3, a ring gear R3, a carrier K3, and a planetary gear P3 which is rotatably supported by the carrier K3 and which meshes with the sun and ring gears S3, R3.

The sun gear S1 and the sun gear S2 are integrally connected to each other, while the ring gear R1, carrier K2 and carrier K3 are integrally connected to each other. The carrier K3 of the third planetary gear set 40 is connected to an output shaft 42 of the automatic transmission 14. Further, the ring gear R2 and the sun gear S3 are integrally connected to each other, and a clutch C1 is provided between the series connection of the ring and sun gears R2, S3 and an intermediate shaft 44 of the automatic transmission 14. A clutch C2 is provided between the series connection of the sun gears S1, S2 and the intermediate shaft 44. A band-type brake B1 is fixed to the housing 41, for inhibiting the rotation of the sun gears S1, S2, while a one-way clutch F1 and a brake B2 are provided in series connection with each other between the series connection of the sun gears S1, S2 and the housing 41. The one-way clutch F1 is adapted to be engaged when the sun gears S1, S2 are rotated in a direction opposite to the direction of rotation of the input shaft 20.

A brake B3 is provided between the carrier K1 and the housing 41. A brake B4 and a one-way clutch clutch F2 are provided in parallel between the ring gear R3 and the housing 41. The one-way clutch F2 is adapted to be engaged when the ring gear R3 is rotated in the reverse direction.

The automatic transmission 14 constructed as described above has one rear-drive position and five forward-drive positions which have different speed ratios I (the rotating speed of the input shaft 20 divided by the rotating speed of the output shaft 42), as indicated in the table of FIG. 2, wherein those positions are indicated as "R" (reverse), "1st" (first-speed), "2nd" (second-speed), "3rd" (third-speed), "4th" (fourth-speed), and "5th" (fifth speed). In FIG. 2, "o" indicates the energized state of solenoid-operated valves S1, S2, S3, S4 and linear solenoid valves SLU, SLT and SLN or the engaged state of the clutches C0–C2 and brakes B0–B4, while "x" indicates the de-energized state of the valves or the released state of the clutches and brakes. It will be understood from the table of FIG. 2 that the brake B2 is engaged when the automatic transmission 14 is shifted from the first-speed position "1st" to the second-speed position "2nd", and is released when the transmission 14 is shifted from the second-speed position to the third-speed position "3rd". Further, the brake B2 is engaged when the transmission 14 is shifted from the second-speed position to the third-speed position. The speed ratios I of the five forward-drive positions "1st", "2nd", "3rd", "4th" and "5th" decrease in this order of description.

It is to be noted that the lower halves of the torque converter 12 and the automatic transmission 14 are not shown in FIG. 1 in the interest of simplification, since these elements 12, 14 are symmetrical with respect to their axes of rotation.

Figure 3:
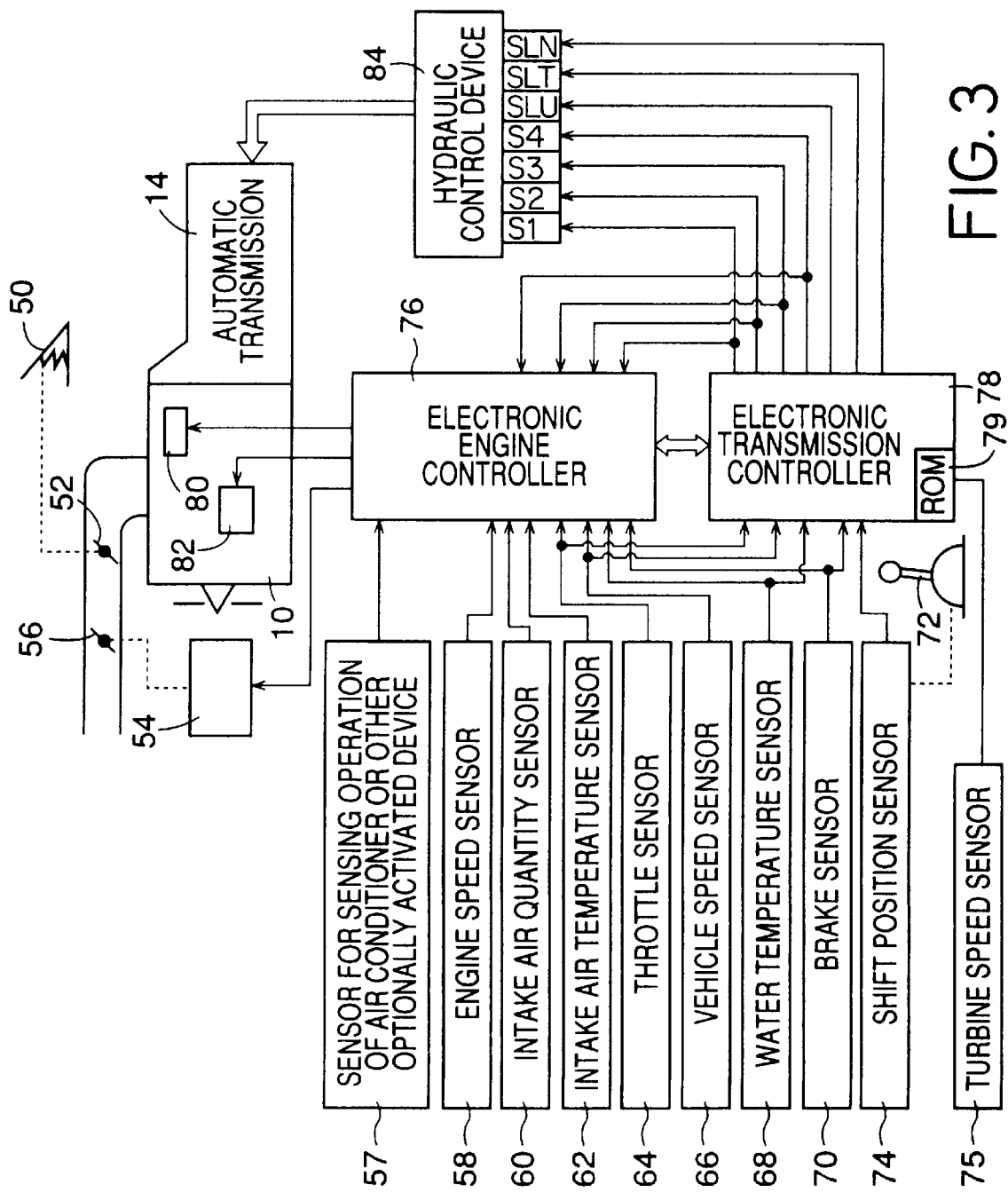
FIG. 3 is a block diagram showing a control system for the motor vehicle, which includes a transmission controller which constitutes a major portion of the slip control apparatus for the lock-up clutch.

Referring next to FIG. 3, there are shown a first throttle valve 52 and a second throttle valve 56 which are disposed in an intake pipe of the engine 10. The first throttle valve 52 is operated by an accelerator pedal 50, while the second throttle valve 56 is operated by a throttle actuator 54. The engine 10 is controlled by an electronic engine controller 76, while the automatic transmission 14 and the lock-up clutch 24 are controlled by an electronic transmission controller 78. These controllers 76, 78 are adapted to receive output signals of various sensors including: a sensor 57 for detecting an operation of an air conditioner or other optionally or selectively activated device; an engine speed sensor 58 for detecting a speed Ne of the engine 10, namely, the rotating speed of the pump impeller 18; an intake air quantity sensor 60 for detecting a quantity Q of an intake air sucked into the engine 10 through the intake pipe; an intake air temperature sensor 62 for detecting a temperature THa of the intake air; a throttle sensor 64 for detecting an opening angle TA of the first throttle valve 51; a vehicle speed sensor 66 for detecting a rotating speed No of the output shaft 42 of the automatic transmission 14 for calculating a running speed V of the motor vehicle; a water temperature sensor 68 for detecting a temperature THw of a coolant water of the engine 10; a brake sensor 70 for detecting an operating state BK of a brake pedal; and a shift position sensor 74 for detecting a currently selected operating position Psh of a shift lever 72. The output signals of those sensors are applied directly or indirectly to the engine and transmission controllers 76, 78. The transmission controller 78 is adapted to receive also an output signal of a turbine speed sensor 75 indicative of a rotating speed $N_T$ of the turbine runner 22. The two controllers 76, 78 are connected to each other by a communication interface, for applying the necessary signals to each other.

The engine controller 76 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the engine 10, more specifically, for effecting a fuel injection control for controlling a fuel injection valve 80 so as to optimize the combustion condition of the engine 10, an ignition control for controlling an ignitor 82 so as to optimize the ignition timing, an engine idling speed control for controlling a suitable by-pass valve to control the idling speed of the engine 10, a traction control for controlling the second throttle valve 56 via the throttle actuator 54 so as to control the traction force of the vehicle drive wheels while preventing slipping of the drive wheels on the road surface, and a fuel cut control for holding the fuel injection valve 80 closed to cut a fuel supply to the engine 10 while the engine speed Ne is higher than a predetermined fuel-cut threshold level $N_{CUT}$ during coasting of the vehicle, so that the fuel economy of the vehicle is improved. The vehicle is considered to be in a coasting state while the first throttle valve 52 is fully closed. The closure of the first throttle valve 52 may be detected by an idling position switch incorporated in the throttle sensor 64. In the present embodiment, the engine controller 76 and the fuel injection valve 80 constitute a major portion of a fuel-cut control device 198 which will be described.

The transmission controller 78 is also comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 24 via a hydraulic control device 84 by controlling the solenoid-operated valves S1, S2, S3 and S4 and the linear solenoid valves SLU, SLN and SLU. For instance, the transmission controller 78 is adapted to control: the linear solenoid valve SLT to produce an output pressure $P_{SLT}$ corresponding to the opening angle TA of the first throttle valve 52; the linear solenoid valve SLN to regulate an accumulator back pressure; and the linear solenoid valve SLU for fully engaging the lock-up clutch 24 or controlling an actual slip speed $N_{SLP}$ of the lock-up clutch 24. The slip speed $N_{SLP}$ is equal to a difference ($Ne-N_T$) between the speed Ne of the engine 10 and the speed $N_T$ of the turbine runner 22. The transmission controller 78 is adapted to select one of the operating positions of the automatic transmission 14 and the engaging state (fully or partially engaging state) of the lock-up clutch 24, on the basis of the opening angle TA of the first throttle valve 52 and the vehicle speed V (calculated from the detected output shaft speed No), and according to predetermined shift patterns (shift boundary lines) stored in the ROM. The transmission controller 78 controls the solenoid-operated valves S1, S2, S3 to as to establish the selected operating position of the automatic transmission 14 and the selected engaging state of the lock-up clutch 24, and de-energize the solenoid-operated valve S4 when engine brake is applied to the vehicle.

Figure 4:
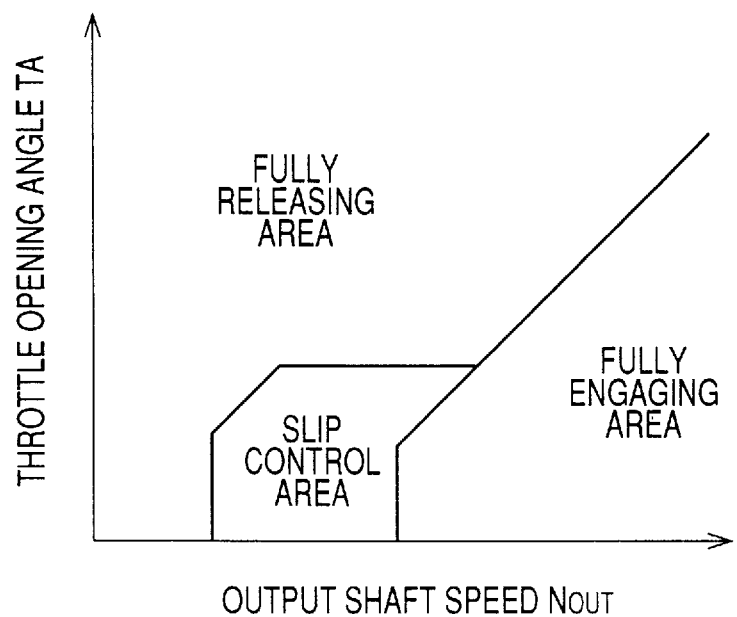
FIG. 4 is a view indicating boundaries defining different control areas of the lock-up clutch in relation to the running condition of the vehicle, which boundaries are stored in the slip control apparatus shown in FIG. 3.

The transmission controller 78 controls the lock-up clutch 22 so as to be fully released while the automatic transmission 14 is placed in the first-speed or second-speed position "1st" or "2nd", and so as to be fully released, partially engaged or fully engaged while the automatic transmission 14 is placed in the third-speed or fourth-speed position "3rd" or "4th". For controlling the lock-up clutch 24 differently depending upon the running condition of the vehicle with the transmission 14 placed in the third- or fourth-speed position, predetermined boundaries defining three different control areas as indicated in FIG. 4 are stored in the ROM 79 (indicated in FIG. 3) of the transmission controller 78. For instance, the boundaries are relationships between the opening angle TA of the first throttle valve 52 and the rotating speed No of the output shaft 42 of the transmission 14 (vehicle running speed V). Described more specifically, these boundaries define a fully releasing area in which the lock-up clutch 24 should be fully released, a fully engaging area in which the lock-up clutch 24 should be fully engaged, and a slip control area in which the slip speed $N_{SLIP}$ of the lock-up clutch 24 should be suitably controlled, that is, the slip control of the lock-up clutch 24 is executed by the transmission controller 78. Depending upon the currently detected throttle opening TA and the output shaft speed No, one of the three control areas is determined or selected by the CPU of the controller 78, according to the boundaries stored in the ROM 79.

When the vehicle running condition (TA and No) is in the slip control area of FIG. 4, for example, the lock-up clutch 24 is controlled to be held in a partially slipping state for transmitting power of the engine 10 to the automatic transmission 14 while absorbing a torque variation of the engine 10 and minimizing power loss at the torque converter 12, so as to maximize the fuel economy of the vehicle without deteriorating the drivability of the vehicle. The slip speed $N_{SLP}$ of the lock-up clutch 24 is also controlled while the vehicle is coasting or decelerating with the throttle valve 52 placed in the idling position. This slip control during deceleration of the vehicle is effected to increase an effect of the fuel cut control of the engine 10 with the engine speed Ne held above the predetermined fuel-cut threshold level $N_{CUT}$. In this case, however, the slip control area is determined on the basis of only the vehicle speed V (output shaft speed No), since the throttle opening angle TA is zero during the coasting of the vehicle.

If the CPU of the controller 78 determines that the vehicle running condition falls in the slip control area, a suitable slip control routine is executed to calculate the actual slip speed $N_{SLP}$ of the lock-up clutch 24, and calculate a desired SLIP CONTROL current $I_{SLU}$ to be applied to the linear solenoid valve SLU so as to eliminate a control error $\Delta E = N_{SLP} - TN_{SLP}$, which error is equal to the actual slip speed $N_{SLP}$ minus a predetermined target slip speed $TN_{SLP}$. The desired SLIP CONTROL current $I_{SLU}$ is expressed as a desired duty ratio $D_{SLU}$ (%) of the linear solenoid valve SLU, which may be calculated according to the following equation (1) (which has been described above):

$$D_{SLU} = DFWD + DFB + KGD \quad (1)$$

The first term DFWD of the right member of the above equation (1) is a feed-forward control value which varies as a function of the output torque of the engine 10, for example. The third term KGD is a learning control valve which changes so as to reflect the changing characteristics of the lock-up clutch 24, for example. The second term DFB is a feedback control value which consists of a proportional value, a differential value and an integral value of the control error $\Delta E$. The feedback control value DFB is calculated according to the following equation (2):

$$DFB = K_p [\Delta E + 1/T_I) \int \Delta E \, dt + T_D (d\Delta E/dt)] \quad (2)$$

With the duty ratio $D_{SLU}$ calculated as described above, a SLIP CONTROL pilot pressure $P_{SLU}$ to be produced by the linear solenoid valve SLU is accordingly adjusted so as to control the lock-up clutch 24 in the slip control mode.

Figure 5:
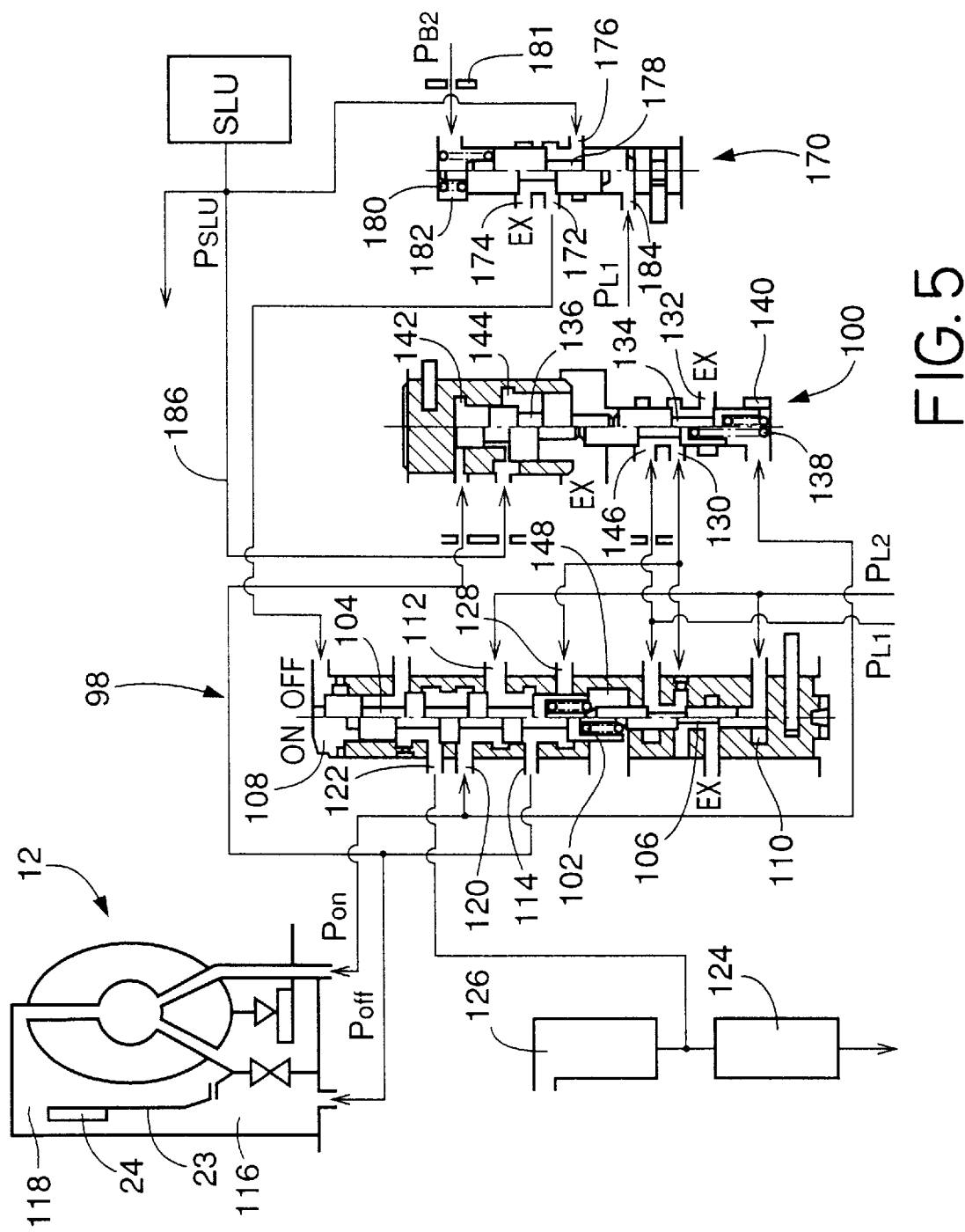
FIG. 5 is a view illustrating a part of a hydraulic control device shown in FIG. 3, which incorporates a circuit for controlling the lock-up clutch.
Figure 6:
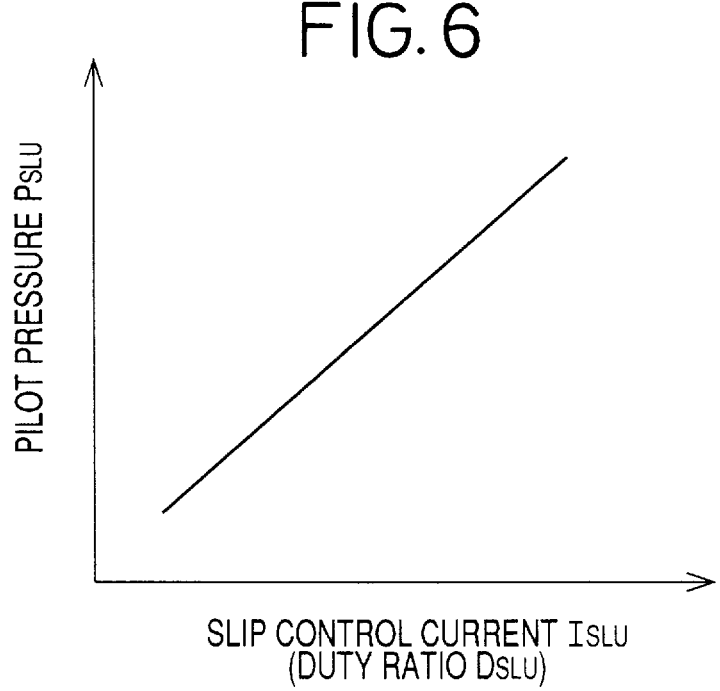
FIG. 6 is a graph indicating an output characteristic of a linear solenoid valve provided in the lock-up clutch control circuit of FIG. 5.

Referring to FIG. 5, there is shown a part of the hydraulic control device 84 which includes the linear solenoid valve SLU which produces the pilot $P_{SLU}$. The linear solenoid valve SLU is a pressure reducing valve whose output pressure $P_{SLU}$ (pilot pressure) increases with an increase in the SLIP CONTROL current $I_{SLU}$, as indicated in the graph of FIG. 6, The duty ratio $D_{SLU}$ of the SLIP CONTROL current $I_{SLU}$ is controlled by the transmission controller 78. The SLIP CONTROL pilot pressure $P_{SLU}$ produced by the linear solenoid valve SLU is applied to a lock-up clutch relay valve 98 and a lock-up clutch control valve 100, which are also included in the hydraulic control device 84.

The lock-up clutch relay valve 98 has: a first spool 104 and a second spool 106; a spring 102 disposed between the first and second spools 104, 106; an oil chamber 108 provided to receive the pilot pressure $P_{SLU}$ for biasing the first and second spools 104, 106 toward an "ON" position corresponding to the fully engaged state of the lock-up clutch 24; and an oil chamber 110 provided to receive a second line pressure $P_{L2}$ for biasing the first and second spools 102, 104 toward an "OFF" position corresponding to the fully released state of the lock-up clutch 24.

When the first spool 104 is placed in the OFF position, the second line pressure $P_{L2}$ applied to an input port 112 is applied to a releasing oil chamber 116 of the torque converter 12 through a releasing port 114, while the working oil is fed out of an engaging oil chamber 118 of the torque converter 12 through a drain port 122 and discharged into a cooler by-pass valve 124 or an oil cooler 126, whereby an engaging pressure of the lock-up clutch 24 is lowered. The engaging pressure of the lock-up clutch 24 is equal to a difference between the pressures in the pressures in the engaging and releasing oil chambers 118, 116, more specifically, the pressure $P_{on}$ in the engaging oil chamber 118 minus the pressure $P_{off}$ in the releasing oil chamber 116. When the first spool 104 is placed in the ON position, on the other hand, the second line pressure $P_{L2}$ applied to the input port 112 is applied to the engaging oil chamber 118 through an engaging port 120, while the oil is discharged from the releasing oil chamber 116 through a drain port 128 of the relay valve 98 and through a control port 130 and a drain port 132 of the lock-up clutch control valve 100, whereby the engaging pressure $(P_{on} - P_{off})$ of the lock-up clutch 24 is raised.

When the SLIP CONTROL pilot pressure $P_{SLU}$ is lower than a predetermined threshold $\beta$, the first spool 104 is placed in the OFF position (indicated on the right side of the centerline of the valve 98 in FIG. 5) by a thrust force based on the biasing force of the spring 102 and the second line pressure $P_{L2}$, so that the lock-up clutch is fully released. When the pilot pressure $P_{SLU}$ is higher than a predetermined threshold $\alpha$, the first spool 104 is placed in the OFF position (indicated on the left side of the centerline of the valve 98 in FIG. 5) by a thrust force based on the pilot pressure $P_{SLU}$, so that the lock-up clutch 24 is fully or partially engaged. That is, the pressure-receiving areas of the first and second spools 104, 106 and the biasing force of the spring 102 are determined so that the first spool 104 is placed in the OFF and ON positions when the pilot pressure $P_{SLU}$ is lower and higher than the threshold values $\beta$ and $\alpha$, respectively. The amount of slip of the lock-up clutch 24 with the spool 104 or relay valve 98 being placed in the ON position is controlled by the lock-up clutch control valve 100 which is operated depending upon the pilot pressure $P_{SLU}$.

The lock-up clutch control valve 100 is provided to fully engage the lock-up clutch 24 or control the slip amount $N_{SLIP}$ of the lock-up clutch 24 according to the received pilot pressure $P_{SLU}$ when the lock-up clutch relay valve 98 is placed in the ON position. The control valve 100 has: a spool 134; a plunger 136 in abutting contact with the spool 134, for biasing the spool 134 toward a discharge position thereof (indicated on the right side of the centerline of the valve 100 in FIG. 5); a spring 138 for biasing the spool 134 toward a supply position thereof (indicated on the left side of e centerline of the valve 100 in FIG. 5); an oil chamber 140 in which the spring 138 is accommodated and which is provided to receive the pressure $P_{on}$ in the engaging oil chamber 118 of the torque converter 12, for biasing the spool 134 toward the supply position; an oil chamber 142 which is partially defined by one end of the plunger 136 and which is provided to receive the pressure $P_{off}$ in the releasing oil chamber 116 of the torque converter 12, for biasing the spool 134 toward the discharge position; and an oil chamber 144 provided in an axially intermediate portion of the plunger 136, to receive the SLIP CONTROL pilot pressure $P_{SLU}$ from the linear solenoid valve SLU.

When the spool 134 is placed in the discharge position, a control port 130 and a drain port 132 of the control valve 100 communicate with each other, resulting in an increase in the engaging pressure ($P_{on}-P_{off}$) of the lock-up clutch 24, causing an increase in the engaging torque of the lock-up clutch 24. When the spool 134 is placed in the supply position, the control port 130 is brought into communication with a supply port 146 by a first line pressure $P_{L1}$ applied thereto, so that the first line pressure $P_{L1}$ is applied to the releasing oil chamber 116, whereby the engaging pressure of the lock-up clutch 24 is lowered, resulting in a decrease in the engaging torque of the lock-up clutch 24.

Figure 7:
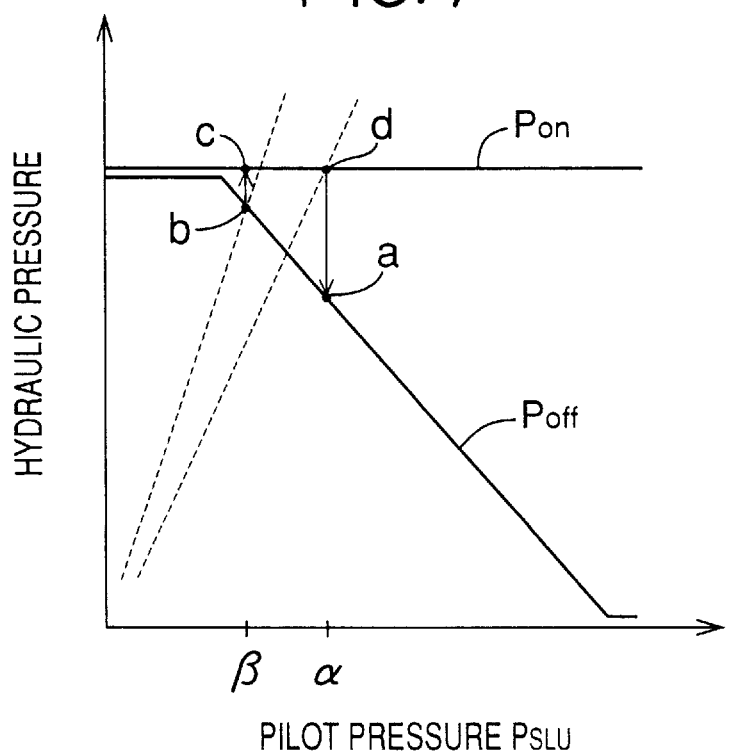
FIG. 7 is a graph indicating an output characteristic of a lock-up clutch control valve provided in the lock-up clutch control circuit of FIG. 5, namely, a relationship between a pilot pressure $P_{SLU}$ received by the lock-up clutch control valve and pressures in engaging and releasing oil chambers of the lock-up clutch.

To fully release the lock-up clutch 24, the transmission controller 78 controls the linear solenoid valve SLU so as to reduce the pilot pressure $P_{SLU}$ to be lower than the threshold β. To fully engage the lock-up clutch 24, the transmission controller 78 controls the linear solenoid valve SLU so as to increase the pilot pressure $P_{SLU}$ to the highest level. The amount of slip of the lock-up clutch 24 is controlled by controlling the pilot pressure $P_{SLU}$ between the threshold level β and the highest level indicated above. Namely, the lock-up clutch control valve 100 is adapted to change the pressures $P_{on}$ and $P_{off}$ in the engaging and releasing oil chambers 118, 116 of the torque converter 12, according to the pilot pressure $P_{SLU}$ received from the linear solenoid valve SLU, as indicated in the graph of FIG. 7, so that the engaging torque and the resulting slip amount of the lock-up clutch 24 are controlled according to the pressure difference $P_{on}-P_{off}$, which is referred to as the "engaging pressure" of the lock-up clutch 24. In other words, the engaging torque and slip amount of the lock-up clutch 24 vary as a function of the pressure difference $P_{on}-P_{off}$, which varies with the SLIP CONTROL pilot pressure $P_{SLU}$. It is noted that the slip amount of the lock-up clutch 24 is equal to the absolute value of the slip speed $N_{SLP}$. When the value of the slip speed $N_{SLP}$ is positive, the engine speed Ne is higher than the turbine runner speed $N_T$. When the value of the slip speed $N_{SLP}$ is negative, the engine speed NE is lower than the turbine runner speed $N_T$.

In the graph of FIG. 7, a left-hand side one of two dashed lines indicates a hydraulic characteristic of the lock-up clutch relay valve 98 required for the first spool 104 to be shifted from the ON position to the OFF position to fully release the lock-up clutch 24, while the other right-hand side dashed line indicates a hydraulic characteristic of the relay valve 98 required for the first spool 104 to be shifted from the OFF position to the ON position to fully or partially engage the lock-up clutch 24. The gradients of these dashed lines are determined by the pressure-receiving areas of the first and second spools 104, 106, the pressure inputs to the relay valve 98 and the characteristic of the spring 102.

The oil chamber 108 of the lock-up clutch relay valve 98 is connected to a solenoid relay valve 170. This solenoid relay valve 170 has: an output port 172 connected to the oil chamber 108 of the relay valve 98; a drain port 174; a an input port 176 provided to receive the SLIP CONTROL pilot pressure $P_{SLU}$ from the linear solenoid valve SLU; a spool 178 having a first position for fluid communication between the output and drain ports 172, 174, and a second position for fluid communication between the output and input ports 172, 186; a spring 180 for biasing the spool 178 toward the second position; an oil chamber 186 in which the spring 180 is accommodated and which is provided to receive through an orifice 181 a brake B2 pressure in the brake B2 of the transmission 14, for biasing the spool 178 toward the second position; and an oil chamber 184 provided to receive the first line pressure $P_{L1}$ for biasing the spool 178 toward the first position. The brake B2 pressure in the brake B2 is generated when the automatic transmission 14 is placed in the third- fourth- or fifth-speed position "3rd", "4th" or "5th". In this arrangement, the SLIP CONTROL pilot pressure $P_{SLU}$ is applied to the oil chamber 108 of the lock-up clutch relay valve 98, only when the automatic transmission 14 is placed in the third-, fourth- or fifth-speed position, and the first spool 104 is moved to the ON position according to the pilot pressure $P_{SLU}$. Since the second line pressure $P_{L2}$ is obtained by lowering the first line pressure $P_{L1}$, the second line pressure $P_{L2}$ is always lower than the first line pressure $P_{L1}$.

The linear solenoid valve SLU is connected to the oil chamber 144 of the lock-up clutch control valve 100 through an oil passage 186, so that the pilot pressure $P_{SLU}$ may be applied directly to the oil chamber 144 of the control valve 100 without passing through the solenoid relay valve 170. This oil passage 186 is provided to operate the control valve 100 by application of the pilot pressure $P_{SLU}$ thereto, for the purpose of detecting possible abnormality that the lock-up clutch relay valve 98 is kept in the ON position for some reason or other.

Figure 8:
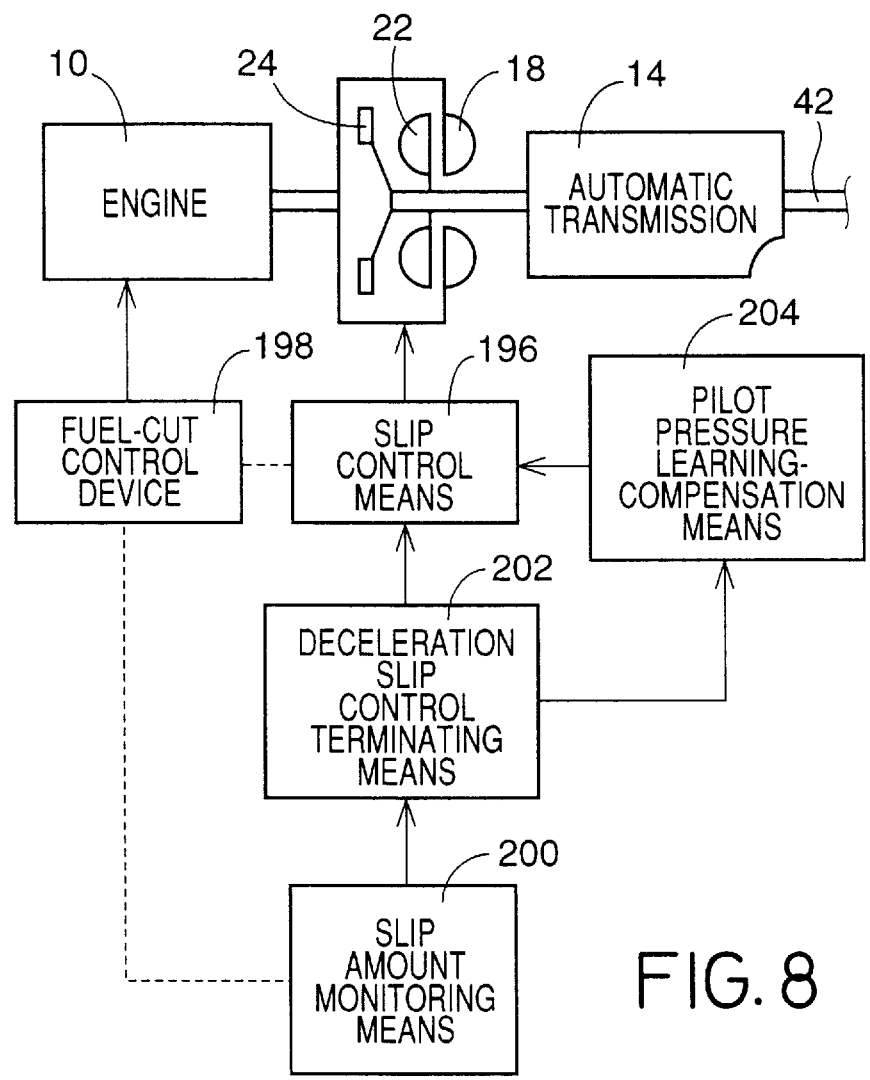
FIG. 8 is a block diagram illustrating the functions of various functional means incorporated in the slip control apparatus.

Referring next to the block diagram of FIG. 8, there will be described the functions of various functional means provided in the slip control apparatus constructed according to the present embodiment of the invention, which apparatus includes the electronic transmission controller 78, engine speed sensor 58, turbine speed sensor 75 and throttle sensor 64. That is, the slip control apparatus incorporates slip control means 196, fuel-cut control device 198, slip amount monitoring means 200, deceleration slip control terminating means 202, and pilot pressure learning-compensation means 204.

When the vehicle running condition is determined to fall in the slip control area explained above by reference to FIG. 4, the slip control means 196 applies to SLIP CONTROL current $I_{SLU}$ to the linear solenoid valve SLU for operating this valve SLU at the duty ratio $D_{SLU}$ calculated according to the above equation (1), so that the detected actual slip speed $N_{SLP}$=Ne−$N_T$ of the lock-up clutch 24 coincides with the target slip speed $TN_{SLP}$, which is predetermined to be about a few or several tens of revolutions per minute (r.p.m.). The fuel-cut control device 198 is adapted to cut a fuel supply to the engine 10 by closing the fuel injection valve 80 a predetermined time after a deceleration slip control of the lock-up clutch 24 by the slip control means 196 is initiated. The deceleration slip control is performed by the slip control means 196 while the vehicle is coasting or decelerating with the throttle valve 52 placed in its engine idling position. The predetermined time indicated above is determined depending upon the vehicle running speed V or other parameter during the deceleration slip control.

The slip amount monitoring means 200 is adapted to determine whether the actual slip amount of the lock-up clutch 24 in the negative direction a predetermined time tSLPE after the initiation of the fuel cut control by the fuel-cut control device 198 is larger than a predetermined threshold KGSLE (e.g., −100 r.p.m.), as a result of a decrease in the slip speed $N_{SLP}$=Ne−$N_T$ (that is, as a result of an increase in the slip amount in the negative direction). The above-indicated predetermined time tSLPE is selected so as to detect the actual slip speed $N_{SLP}$ in a transient phase of the deceleration slip control of the lock-up clutch 24 during the fuel cut control of the engine, in which the slip speed $N_{SLP}$ changes in a considerable degree as a result of the initiation of the fuel cut control. Usually, the time tSLPE is selected to be about 400 ms. The threshold value KGSLE is an upper limit of the slip amount of the lock-up clutch 24 in the transient phase of the deceleration slip control, namely, in an initial period of the deceleration slip control in which the slip amount of the lock-up clutch 24 tends to considerably vary. The deceleration slip control terminating means 200 is adapted to terminate the deceleration slip control of the lock-up clutch 24 by the slip control means 196 if the slip amount monitoring means 200 determines that the actual slip speed $N_{SLP}=Ne-N_T$ is smaller than the threshold KGSLE. The pilot pressure learning-compensation means 204 is adapted to increase the pilot pressure $P_{SLU}$ if the deceleration slip control of the lock-up clutch 24 is terminated by the deceleration slip control terminating means 203. An increase in the pilot pressure $P_{SLU}$ by the pilot pressure learning-compensation means 204 will reduce a decrease in the actual slip speed $N_{SLP}$ of the lock-up clutch 24 in the transient phase in the next deceleration slip control.

Figure 9:
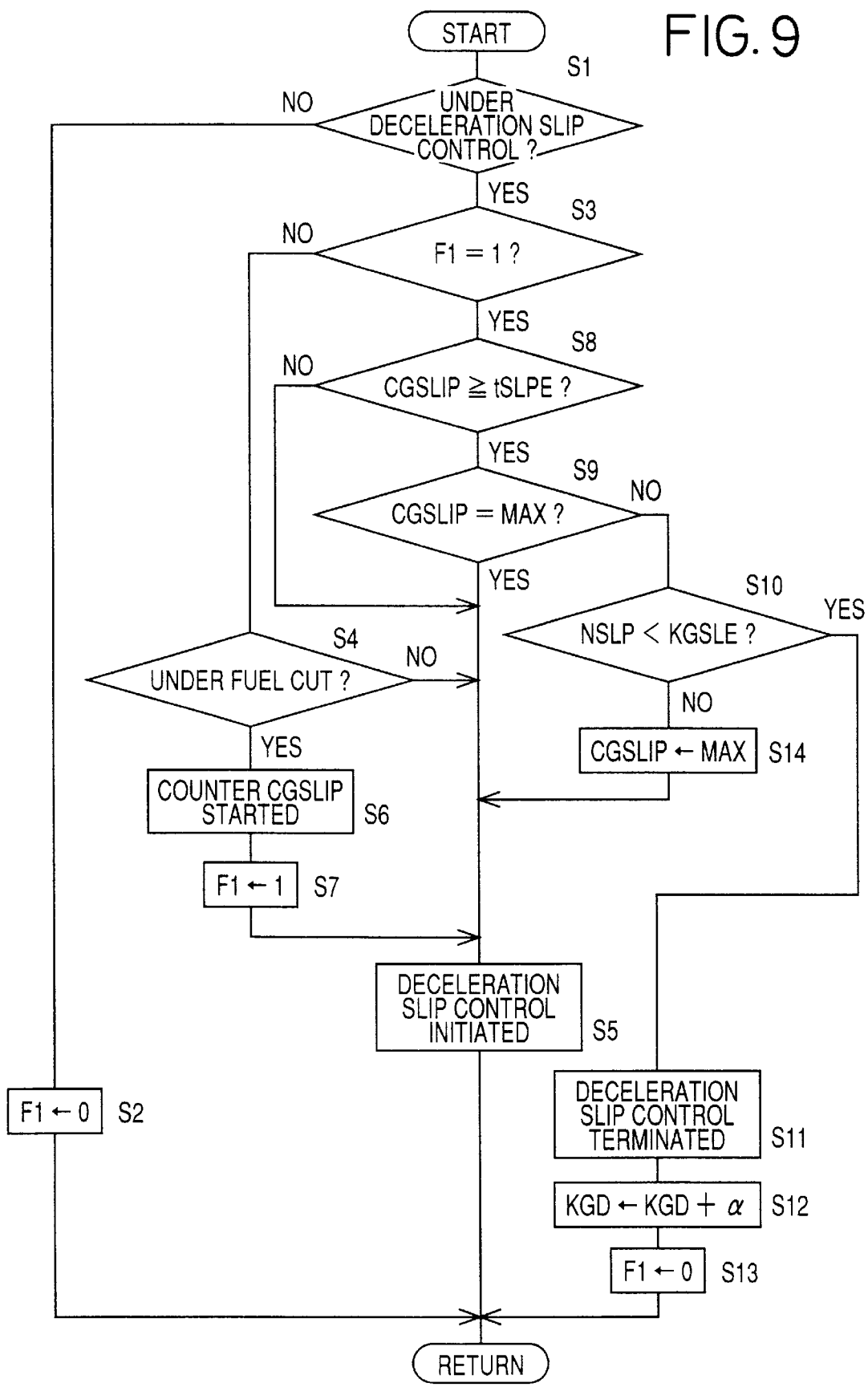
FIG. 9 is a flow chart illustrating an operation of the transmission controller of FIG. 3.
Figure 10:
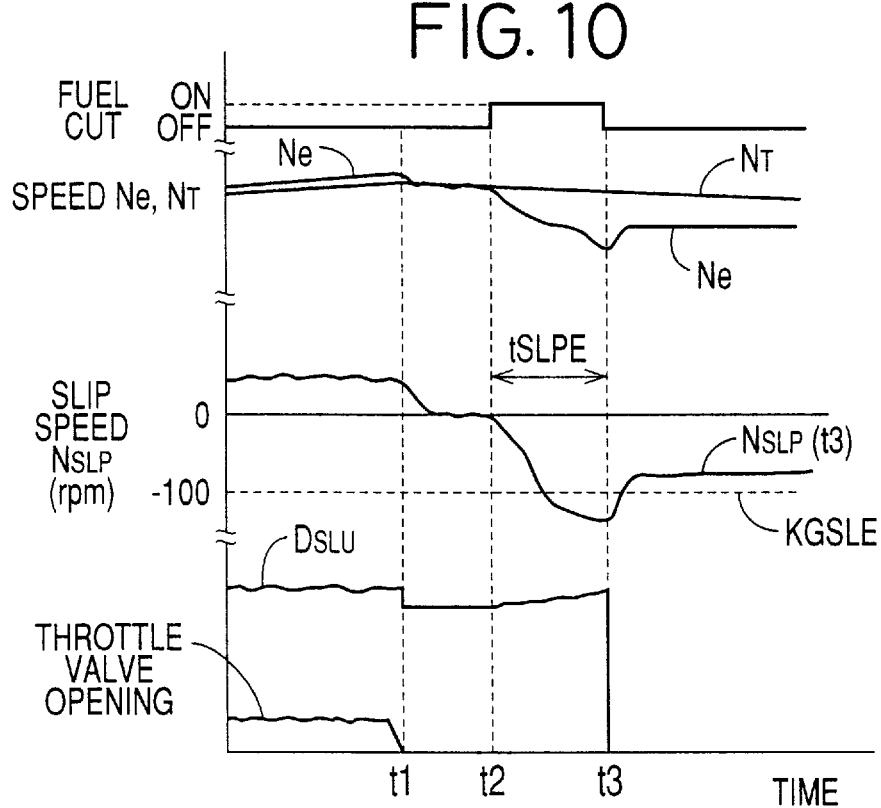
FIG. 10 is a time chart for explaining an example in which a deceleration slip control of the lock-up clutch executed as part of the operation of FIG. 9 is terminated due to an increase in an actual slip amount of the lock-up clutch.

An operation of the electronic transmission controller 78 will be described by reference to the flow chart of FIG. 9 and the time chart of FIG. 10 showing changes in the slip speed $N_{SLP}$ and other parameters.

The routine of FIG. 9 is initiated with step S1 to determine whether the lock-up clutch 24 is under the deceleration slip control by the slip control means 196. In the example of FIG. 10, the lock-up clutch 24 is under an acceleration slip control by the slip control means 196, up to a point of time t1. The acceleration slip control means a slip control of the lock-up clutch 24 while the vehicle is in an accelerating process. Up to the point of time t1, therefore, a negative decision (NO) is obtained in step S1, and the control flow goes to step S2 to reset a flag F1 to "0". In this case, one cycle of execution of the routine of FIG. 9 is completed. In the example of FIG. 10, the accelerator pedal 50 which has been depressed is returned to its non-operated position at the point of time t1, and the opening angle TA of the first throttle valve 52 is zeroed. As a result, the acceleration slip control of the lock-up clutch 24 is terminated, and the deceleration slip control is initiated, whereby an affirmative decision (YES) is obtained in step S1, and the control flow goes to step S3. With the throttle opening angle TA being substantially zeroed, the speed Ne of the engine 10 is lowered, and the drive torque of the engine 10 is reduced. As a result, the pressure difference $\Delta P$ ($P_{on}-P_{off}$) which corresponds to a force of engagement of the lock-up clutch 24 becomes excessively high, and the lock-up clutch 24 is temporarily fully engaged. Consequently, the engine speed Ne becomes equal to the speed $N_T$ of the turbine runner 18 of the torque converter 12, and the actual slip speed $N_{SLP}$ of the lock-up clutch 24 is zeroed. It is also noted that substantial zeroing of the throttle opening angle TA results in reducing the feed-forward control value, causing a decrease in the duty ratio $D_{SLU}$ at the point of time t1.

Step S3 is provided to determine whether the flag F1 is set at "1". When this flag F1 is set at "1", the flag F1 indicates that the fuel cut control of the engine 10 by the fuel-cut control device 198 has been initiated after the initiation of the deceleration slip control of the lock-up clutch 24. As described above, the fuel cut control by the fuel-cut control device 198 is initiated a predetermined time after the initiation of the deceleration slip control of the lock-up clutch 24. Therefore, a negative decision (NO) is obtained in step S3 when this step S3 is implemented for the first time. In this case, the control flow goes to step S4 to determine whether the engine 10 is under the fuel cut control by the fuel-cut control device 198. When this step S4 is initially implemented, a negative decision (NO) is obtained, and the control flow goes to step S5 in which the deceleration slip control of the clutch 24 is continued. Then, the control flow returns to step S1.

Step S5 is repeatedly implemented up to a point of time t2, at which the fuel cut control is initiated, whereby an affirmative decision (YES) is obtained in step S4. In this case, the control flow goes to step s6 to start a time counter CGSLIP for measuring a time duration of the fuel cut control. That is, the time counter CGSLIP is provided to measure a time after the initiation of the fuel cut control. Then, step S7 is implemented to set the flag F1 to "1", and then step S5 is implemented to continue the deceleration slip control of the lock-up clutch 24. In the next cycle of execution of the routine, an affirmative decision (YES) is obtained in step S3 since the fuel cut control was started in step S4 and the flag F1 was set to "1" in step S7. Accordingly, step S3 is followed by step S8 to determine whether the time represented by the time counter CGSLIP is equal to or longer than the predetermined time tSLPE. Since a negative decision (NO) is initially obtained in step S8, the control flow goes to step S5 to continue the deceleration slip control.

It is noted that the initiation of the fuel cut control of the engine 10 results in an increase in the drive force which is transmitted from the drive wheels to the engine 10. That is, the speed $N_T$ of the turbine runner 22 is made higher than the engine speed Ne. As a result, the pressure difference $\Delta P=P_{on}-P_{off}$ after the fuel cut control is made smaller than that before the fuel cut control, and the engine speed Ne is lowered, whereby the absolute value of the negative actual slip amount $N_{SLP}$ (slip amount of the lock-up clutch 24) increases, that is, the actual slip speed $N_{SLP}=Ne-N_T$ decreases, during a period t2–t3 as indicated in FIG. 10. That is, the duty ratio $D_{SLU}$ of the linear solenoid valve SLU controlled in the feedback manner after the initiation of the fuel cut control increases at a relatively low rate, due to a relatively small feed-forward control value DFWD which corresponds to the throttle opening angle TA, which is zero during the deceleration slip control of the lock-up clutch 24. Accordingly, the actual slip speed $N_{SLP}$ greatly decreases (namely, the slip amount of the clutch 24 in the negative direction greatly increases) during the period t2–t3.

An affirmative decision (YES) is obtained in step S8 at the point of time t3 which is the predetermined time tSLPE after the initiation of the fuel cut control. If a negative decision (NO) is obtained in step S9, the control flow goes to step S10 to determine whether the actual slip speed $N_{SLP}=Ne-N_T$ is smaller than the predetermined threshold KGSLE (negative value). At the point of time t3, an affirmative decision (YES) is obtained in step S9 in the example of FIG. 10, and the control flow goes to step S11 to terminate the deceleration slip control of the lock-up clutch 24, whereby the duty ratio $D_{SLU}$ is zeroed, and the fuel cut control by the fuel-cut control device 198 is terminated, so that the engine 10 is given a drive force in the forward direction. Consequently, the actual slip speed $N_{SLP}=Ne-N_T$ is reduced (that is, the slip amount in the negative direction is reduced), and the engine speed Ne increases from the lowest level, by an amount corresponding to the idling speed of the engine 10.

In the present embodiment, step S10 corresponds to the slip amount monitoring means 200, while step S11 corresponds to the deceleration slip control terminating means 202. In the example of FIG. 10, the deceleration slip control of the lock-up clutch 24 by the slip control means 196 is terminated at the point of time t3 at which the actual slip speed $N_{SLP}$ is smaller than the threshold KGSLE, that is, the slip amount of the lock-up clutch 24 in the negative direction exceeds a predetermined threshold value.

The value MAX used in step S9 is the maximum value of the content of the time counter CGSLIP. After the content of the time counter CGSLIP has reached the maximum value MAX, the content is held at this value MAX, until the time counter CGSLIP is reset in step S6, for example. The threshold KGSLE for the slip speed $N_{SLP}$ used in step S10 is determined to be a value (e.g., about −100 r.p.m.) above which the engaging shock of the lock-up clutch 24 is intolerably large due to an excessive slip amount thereof.

Step S11 in which the deceleration slip control is terminated is followed by step S12 in which the learning control value KGD used in the above equation (1) is incremented by a predetermined increment α, that is, the predetermined increment α is added to the present value KGD. Then, the control flow goes to step S13 to reset the flag F1 to "0", and one cycle of execution of the routine is terminated.

Figure 11:
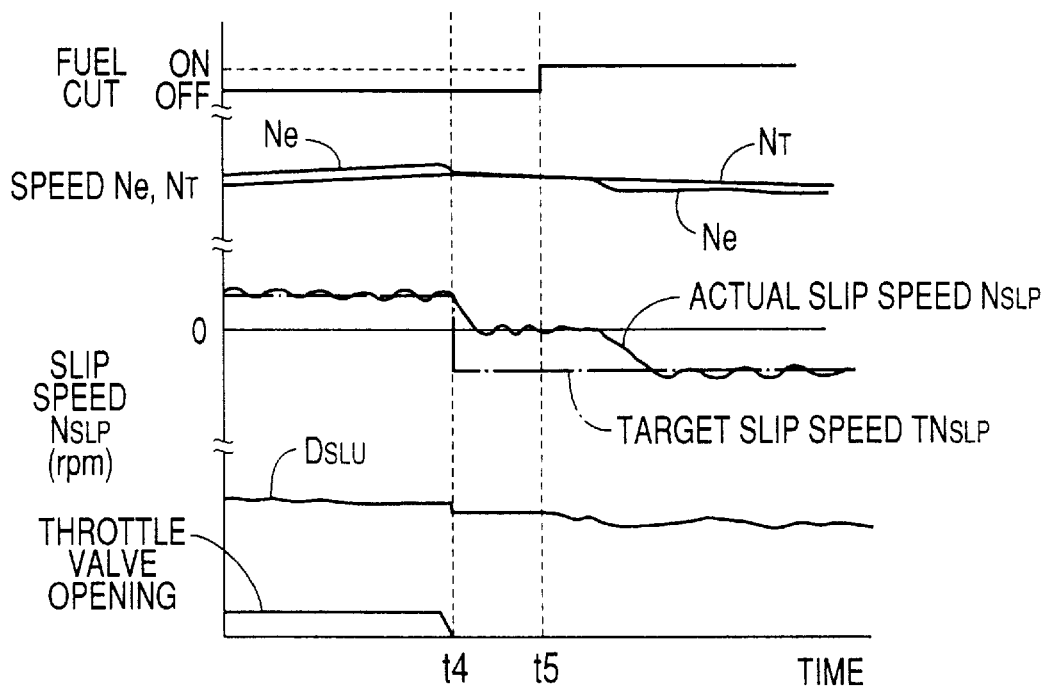
FIG. 11 is a time chart for explaining an example of the deceleration slip control executed after a learning control value used for the control is compensated.
Figure 12:
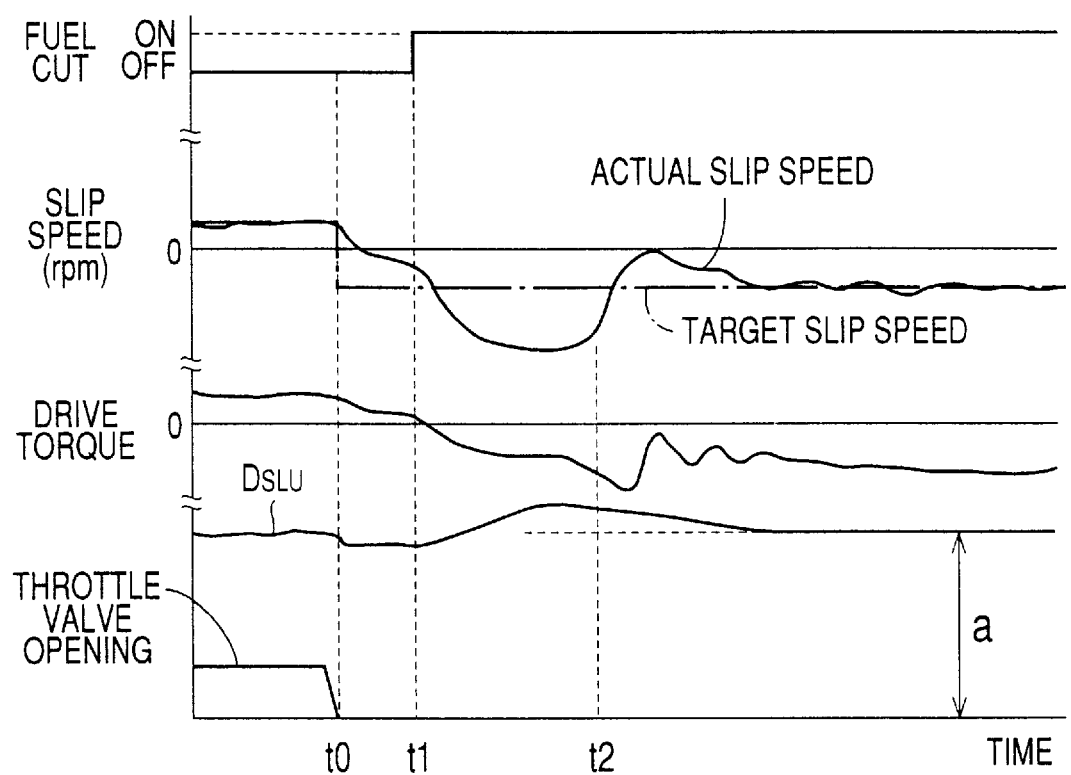
FIG. 12 is a time chart for explaining an example in which the lock-up clutch undergoes an engaging shock where the deceleration slip control is continued even after an increase in the actual slip amount of the lock-up clutch.

The graph of FIG. 11 shows an example in which another deceleration slip control of the lock-up clutch 24 by the slip control means 196 is initiated after the last deceleration slip control was terminated due to an excessive increase of the slip amount of the lock-up clutch 24 in the negative direction (i.e., due to an excessive decrease in the slip speed $N_{SLP}$) as in the example of FIG. 10. In the example of FIG. 11, a acceleration slip control of the lock-up clutch 24 is replaced by the deceleration slip control at the point of time t4 as a result of substantial zeroing of the throttle opening angle TA. At this time t4, the affirmative decision (YES) is obtained in step S1, and the control flow goes to step S3, but the negative decision (NO) is obtained in step S3 since the fuel cut control of the engine 10 has not been initiated. Therefore, step S3 is followed by steps S4 and S5, and one cycle of execution of the routine is completed. At the point of time t5, the fuel cut control is initiated, and the time counter CGSLIP is started in step S6, and the flag F1 is set to "1" in step S7.

Since the learning control value KGD was incremented by the predetermined amount α in step S12 after the deceleration slip control was terminated in step S11 at the point of time t3 in FIG. 10, the duty ratio DSLU upon initiation of the deceleration slip control at the point of time t4 in FIG. 11 is increased, whereby the pressure difference ΔP is accordingly increased, so that after the point of time t5, the slip speed $N_{SLP}=Ne-N_T$ will not considerably decrease, that is, the slip amount of the lock-up clutch 24 in the negative direction will not considerably increase. Therefore, the actual slip speed $N_{SLP}$ is eventually made substantially equal to the target slip speed $TN_{SLP}$. Thus, the present arrangement is effective to assure a smooth transition of the slip control of the lock-up clutch 24, from the acceleration slip control to the deceleration slip control. It will be understood that the learning control value KGD used in the above equation (1) to determine the pilot pressure $P_{SLU}$ and the slip speed $N_{SLP}$ is compensated by the predetermined increment amount α in step S12 each time the deceleration slip control is terminated in step S11, so that the SLIP CONTROL pilot pressure $P_{SLU}$ in the next deceleration slip control is adjusted to a higher level. In the present embodiment, step S12 corresponds to the pilot pressure learning-compensation means 204 for compensating the pilot pressure $P_{SLU}$ when the deceleration slip control by the slip control means 196 is terminated by the deceleration slip control terminating means 202.

If the affirmative decision (YES) is obtained in step S3 in the next cycle of execution of the routine of FIG. 9, step S8 and the following steps are implemented, In this case, the negative decision (NO) is obtained in step S10 the predetermined time tSLPE after the initiation of the fuel cut control, and step S14 is implemented to set the time counter CGSLIP to the maximum value MAX. Then, the control flow goes to step S5 to continue the deceleration slip control. In the following cycles of execution of the routine, the affirmative decision (YES) is obtained in steps S8 and S9, and step S5 is implemented. Thus, the deceleration slip control is continued. It will be understood that step S10 is implemented only once when the predetermined time tSLPE has passed after the initiation of the fuel cut control.

As described above, the slip control apparatus for controlling the lock-up clutch 24 according to the present embodiment of this invention is adapted such that the deceleration slip control terminating means 202 terminates in step S11 a deceleration slip control of the lock-up clutch 24 by the slip control means 198 when the slip amount monitoring means 200 determines in step S10 that the amount of slip of the lock-up clutch 24 (in the negative direction with the engine speed Ne being lower than the turbine runner speed $N_T$) is larger than a predetermined threshold, that is, that the actual slip speed $N_{SLP}$ is lower than the predetermined threshold KGSLE.

Thus, the present slip control apparatus is adapted to determine whether the deceleration slip control of the lock-up clutch 24 should be continued or not, on the basis of the actual slip amount of the clutch 24 in a transient phase a relatively short time after the fuel cut control of the engine 10 is initiated. Therefore, the present arrangement is effective to reduce a delay in the determination to terminate the deceleration slip control, which delay would occur if the determination was based on only the engine speed Ne. Accordingly, the present arrangement assures accurate determination as to whether the transition to the deceleration slip control is suitably effected. To determine whether the deceleration slip control should be continued, two different threshold values may be used in the transient and steady phases during the deceleration slip control. In this case, the threshold KGSLE used in the transient phase which is determined independently of the threshold used in the steady phase provides a comparatively stringent standard which permits more reliable and accurate determination as to whether the deceleration slip control of the lock-up clutch 24 is effected in a suitable manner in an initial period of the control, than in the case where the same threshold is used in the transient and steady phases during the deceleration slip control.

It is also noted that the determination in step S10 as to whether the actual slip amount of the lock-up clutch 24 is larger than the predetermined transient phase threshold KGSLE is effected the predetermined suitable time tSLPE after the initiation of the fuel cut control of the engine 10. During or upon expiration of this time duration tSLPE, the actual slip speed $N_{SLP}$ of the lock-up clutch 24 is expected to have reduced to the smallest value, that is, the actual slip amount of the clutch 24 in the negative direction is expected to have increased to the largest value. Therefore, the above determination effected upon expiration of the predetermined time tSLPE permits detection of the actual slip speed $N_{SLP}$ which accurately reflects the condition of the deceleration slip control after the initiation of the fuel cut control in the initial transient phase, even where the time between the initiation of the deceleration slip control and the initiation of the fuel cut control is changed depending upon the running speed V of the vehicle. As indicated in the graph of FIG. 10, an increase in the slip amount of the lock-up clutch 24 in the negative direction (that is, a decrease in the slip speed $N_{SLP}$) begins upon or immediately after the initiation of the fuel cut control of the engine 10. In view of this fact, the determination as to whether the amount of increase in the slip amount of the lock-up clutch 24 is so large that the deceleration slip control should be terminated is effected only after the predetermined suitable time tSLPE has passed after the initiation of the fuel cut control. This arrangement assures an adequate result of the determination irrespective of the running speed V of the vehicle which determines the time between the moments of initiation of the deceleration slip control and the fuel cut control.

If the time tSLPE is excessively long, that is, if the determination in step S10 is effected a considerably long time after the initiation of the fuel cut control, a possible engaging shock of the lock-up clutch 24 in the transient phase of the deceleration slip control cannot be suitably prevented. If the time tSLPE is excessively short, on the other hand, the slip speed $N_{SLP}$ may continue to decrease even after the determination in step S10, and the determination does not accurately reflect the actual slip amount of the lock-up clutch 24 in the transient phase. In the present embodiment, the time tSLPE is empirically determined to be about 400 ms.

The present slip control apparatus is further adapted such that the pilot pressure learning-compensation means 204 compensates the learning control value KGD by incrementing it by the predetermined amount α in step S11 when the deceleration slip control terminating means 202 terminates in step S11 the deceleration slip control.

In the present apparatus, therefore, the slip amount of the lock-up clutch 24 in the next deceleration slip control (initiated at the point of time t4 in FIG. 11) is controlled according to the SLIP CONTROL pilot pressure $P_{SLU}$ which is changed by an amount corresponding to a change in the learning control value KGD by the pilot pressure learning-compensation means 204 which was operated upon termination of the last deceleration slip control by the deceleration slip control terminating means 202 (at the point of time t3 in FIG. 10). This arrangement is effective to prevent an increase in the slip amount of the lock-up clutch 24 in the negative direction in the above-indicated next deceleration slip control, which increase would cause the deceleration slip control terminating means 202 to terminate the deceleration slip control again. In this respect, it is noted that an increase in the slip amount of the lock-up clutch 24 immediately after the initiation of the deceleration slip control generally arises from an excessively low level of the SLIP CONTROL pilot pressure $P_{SLU}$ at the time of the initiation of the deceleration slip control. Therefore, in the event of termination of a deceleration slip control of the lock-up clutch 24 by the terminating means 202, the pilot pressure $P_{SLU}$ is increased according to the present embodiment, to avoid an increase in the slip amount of the lock-up clutch 24 in the next deceleration slip control, namely, to assure smooth transition from the acceleration slip control to the deceleration slip control.

In the present slip control apparatus, the SLIP CONTROL pilot pressure $P_{SLU}$ is controlled according to the duty ratio $D_{SLU}$ which is determined on the basis of the feed-forward control value DFWD, the learning control value KGD and the feedback control value DFB. As described above, the feed-forward control value DFWD is determined by the output torque of the engine 10, and the learning control value KGD which is also a feed-forward control component is determined depending upon the present characteristics of the lock-up clutch 24, while the feedback control value DFB is determined on the basis of the difference ΔE between the actual slip speed $N_{SLP}$ and the target slip speed $TN_{SLP}$. The pilot pressure learning-compensation means 204 compensates the learning control value KGD (one of the feed-forward components used to calculate the duty ratio $D_{SLU}$) so as to be incremented for increasing the pilot pressure $P_{SLU}$ each time the slip amount of the lock-up clutch 24 is found excessively large. Since the compensation of the learning control valve KGD is comparatively easy, the adjustment of the pilot pressure $P_{SLU}$ by compensating the learning control value KGD is comparatively easy.

While one presently preferred embodiment of the present invention has been described in detail by reference to the accompanying drawings, the present invention may be otherwise embodied.

In the illustrated embodiment, the actual slip speed $N_{SLP}$ is compared with the threshold KGSLE in step S10. However, the difference ΔE between the actual slip speed $N_{SLP}$ and the target slip speed $TN_{SLP}$ may be compared with a predetermined threshold, since the target slip speed $TN_{SLP}$ is held constant as indicated by one-dot chain line in FIG. 11. This modification also permits determination as to whether the amount of slip of the lock-up clutch 24 (in the negative direction) is larger than a predetermined threshold.

The illustrated embodiment is adapted to effect the above determination of the slip speed $N_{SLP}$ only once in step S10 when the predetermined time tSLPE has passed after the fuel cut control of the engine 10 is initiated. However, the determination may be effected continuously or a desired number of times during the period of tSLPE in the transient phase of the lock-up clutch 24 immediately after the initiation of the fuel cut control, provided that a change (decrease) of the slip speed $N_{SLP}$ is expected to be completed in that period.

Although the time counter CGSLIP to detect the moment at which step S10 is implemented to effect the above determination is starated upon initiation of the fuel cut control of the engine 10, the time counter may be started upon initiation of the deceleration slip control of the lock-up clutch 24. In this case, the threshold tSLPE should be changed depending upon the vehicle speed V, since the time between the moments of initiation of the deceleration slip control and the fuel cut control is changed as a function of the vehicle speed.

The slip control apparatus of the illustrated emobdiment is adapted such that the learning control value KGD is compensated in step S12 by the pilot pressure learning-compensation means 204 if the deceleration slip control is terminated in step S11 by the deceleration slip control terminating means 204, so that the slip speed $N_{SLP}$ may be controlled to coincide with the target value $TN_{SLP}$ in the next deceleration slip control. However, the feed-forward control value DFWD may be compensated, or alternatively, the duty ratio $D_{SLU}$ per se may be compensated.

Further, the threshold KGSLE of the slip speed $N_{SLP}$ may be suitably determined or changed depending upon the time tSLPE and/or the desired amount of tolerance of the engaging shock of the lock-up clutch 24. If it is desired to effect the determination at a relatively early point of time or to reduce the engaging shock of the lock-up clutch 24, the threshold KGSLE is accordingly reduced, for example, to about −50 r.p.m.

In the illustrated embodiment, the slip speed $N_{SLP}$ is calculated on the basis of the engine speed Ne detected by the engine speed sensor 58 and the speed $N_T$ of the turbine runner 22 (input shaft 20 of the automatic transmission 14) detected by the turbine speed sensor 75. However, the speed Nout of the output shaft 42 of the automatic transmission 14 detected by the vehicle speed sensor 66 may be used in place of the speed $N_T$. In this case, the speed $N_T$ may be calculated by multiplying the speed Nout by the currently established speed ratio I of the automatic transmission 14.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch interposed between a pump impeller and a turbine runner of a fluid-filled power transmitting device of a motor vehicle equipped with a fuel-cut control device for cutting a fuel supply to an engine when a speed of the engine is higher than a predetermined fuel-cut level, said apparatus including slip control means which is capable of effecting a deceleration slip control wherein a pilot pressure for controlling said lock-up clutch is controlled during deceleration of the vehicle such that an actual slip amount of said lock-up clutch coincides with a predetermined target value, said apparatus comprising:

slip amount monitoring means for determining whether said actual slip amount of said lock-up clutch a predetermined time after initiation of an operation of said fuel-cut control device to cut said fuel supply to the engine in an initial transient phase of said deceleration slip control by said slip control means is larger than a predetermined threshold; and deceleration slip control terminating means for terminating said deceleration slip control of said lock-up clutch by said slip control means, if said slip amount monitoring means determines that said actual slip amount is larger than said predetermined threshold.

2. An apparatus according to claim 1, further comprising pilot pressure learning-compensation means operated when said deceleration slip control is terminated by said deceleration slip control terminating means, for increasing said pilot pressure to be established in a next operation of said deceleration slip control by said slip control means.

3. An apparatus according to claim 2, wherein said pilot pressure learning-compensation means increments said pilot pressure by a predetermined increment each time said deceleration slip control terminating means has terminated said deceleration slip control of said lock-up clutch by said slip control means.

4. An apparatus according to claim 2, said slip control means controls said pilot pressure by controlling a duty ratio of a linear solenoid valve which produces said pilot pressure, said slip control means determining said duty ratio on the basis of at least one feed-forward control value determined by at least one of an output torque of said engine and characteristics of said lock-up clutch, and a feedback control value determined by a difference between said actual slip amount of said lock-up clutch and said predetermined target value, said pilot pressure learning-compensation means increasing at least one of said at least one feed-forward control value when said slip amount monitoring means determines that said actual slip amount is larger than said predetermined threshold.

5. An apparatus according to claim 4, wherein said at least one feed-forward control value includes a feed-forward control value determined on the basis of said output torque of said engine which varies as a function of an opening angle of a throttle valve of the engine and a rotating speed of said engine, and a learning control value determined by the characteristics of said lock-up clutch, said pilot pressure learning-compensation means increasing said learning control value when said slip amount monitoring means determines that said actual slip amount is larger than said predetermined threshold.

6. An apparatus according to claim 1, wherein said slip amount monitoring means comprises an engine speed sensor for detecting a rotating speed of said engine, and a turbine speed sensor for detecting a rotating speed of said turbine runner.

7. An apparatus according to claim 1, wherein said slip amount monitoring means comprises time measuring means for measuring a time which has passed after initiation of the operation of said fuel-cut control device, and comparing means for comparing the time measured by said time measuring means with a predetermined time.

8. An apparatus according to claim 1, wherein said slip amount monitoring means detects a slip speed of said lock-up clutch which is equal to a rotating speed of said engine minus a rotating speed of said turbine runner, and compares the detected slip speed with a predetermined threshold which is a negative value.

* * * * *